Figures 3C, 3D:
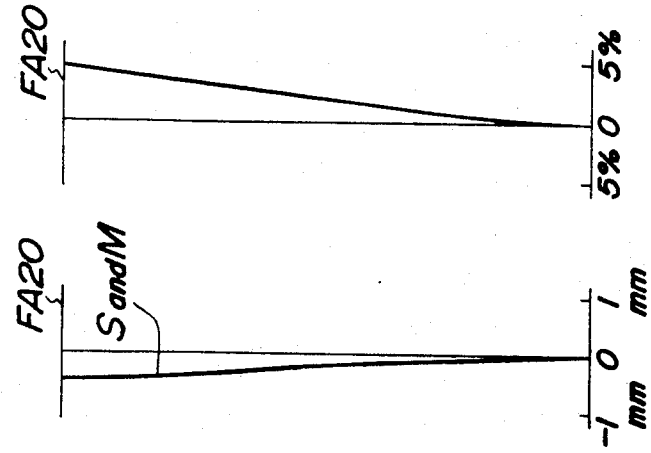
Figure 3B:
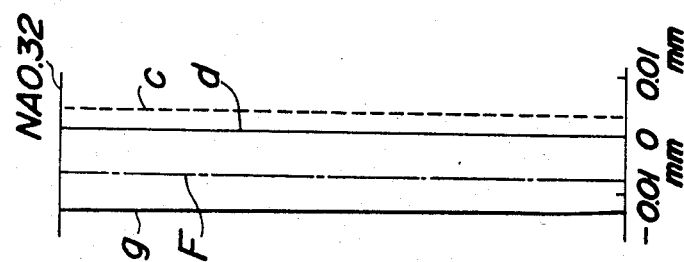

United States Patent
Nakagawa

[11] 3,756,698
[45] Sept. 4, 1973

[54] PLANAPOCHROMATIC OBJECTIVE LENS SYSTEMS FOR USE IN MICROSCOPES

[75] Inventor: Jihei Nakagawa, Tokyo, Japan

[73] Assignee: Olympus Optical Company Limited, Shibuya-ku, Tokyo, Japan

[22] Filed: June 29, 1972

[21] Appl. No.: 267,493

[30] Foreign Application Priority Data
  Feb. 12, 1972  Japan.............................. 47/15057

[52] U.S. Cl............ 350/220, 350/175 ML, 350/177
[51] Int. Cl........................ G02b 9/34, G02b 21/02
[58] Field of Search.................... 350/175 ML, 220, 350/177

[56] References Cited
FOREIGN PATENTS OR APPLICATIONS
17,630  6/1970  Japan.......................... 350/175 ML

*Primary Examiner*—John K. Corbin
*Attorney*—Eric H. Waters et al.

[57] ABSTRACT

A planapochromatic objective lens system for use in microscopes, which is constructed as two groups and six lenses and in which a first group of lenses comprises a first negative meniscus lens that has at its object side a concave surface, and a second positive lens slightly air spaced from the first meniscus lens, and a second group of lenses is separated from the first group of lenses by a long air space and comprises a compound lens including third, fourth and fifth lenses, the fourth lens sandwiched between the third and fifth lenses being made of fluospar, and a sixth positive lens having a significantly large dispersive power, and which is defined by the following five conditions, i.e., 1. $\nu > 45$ for all lenses except the first lens,
2. $\nu_6 \geqq 70$,
3. $30 > \nu_5 - \nu_3 > 10$,
4. $d_1 > |r_1| + |r_2|/2$, and
5. $r_5 < 0$ where $\nu$ is the dispersive power of all of the lenses, $\nu_3$, $\nu_5$ and $\nu_6$ are the dispersive powers of the third, fifth and sixth lenses, respectively, $d_1$ is the axial thickness of the first lens, and $r_1$, $r_2$ and $r_5$ are the radii of curvatures of the front and rear surfaces of the first lens and of the front surface of the third lens, respectively, wherein specific values are chosen for the air spaces, refractive indexes and dispersive powers of the six lenses.

1 Claim, 13 Drawing Figures

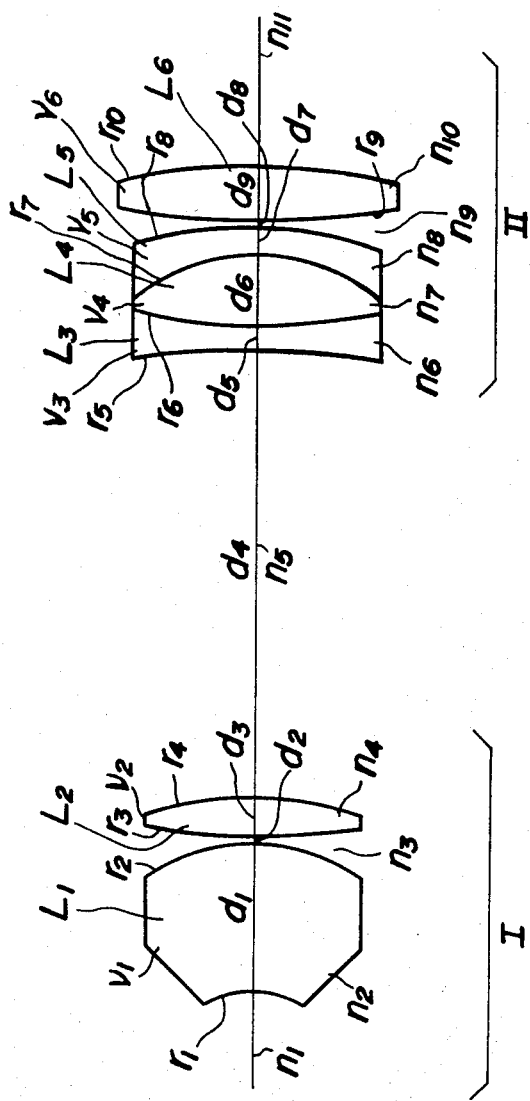

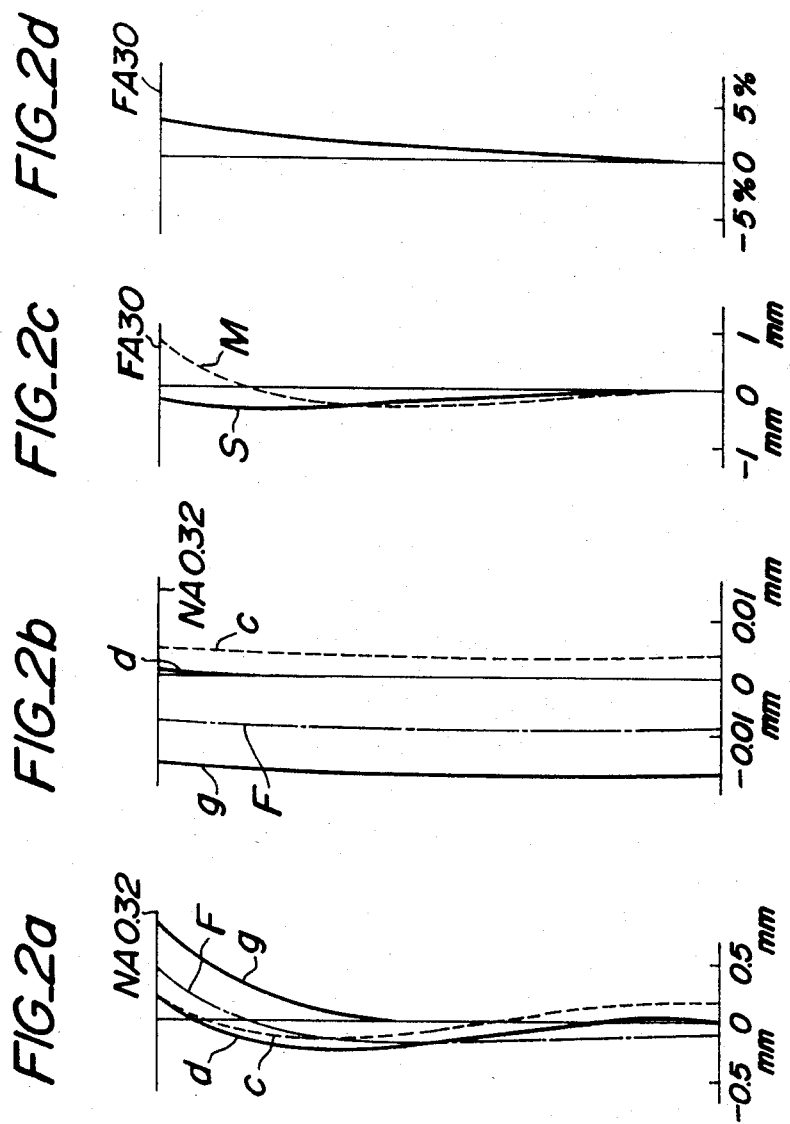

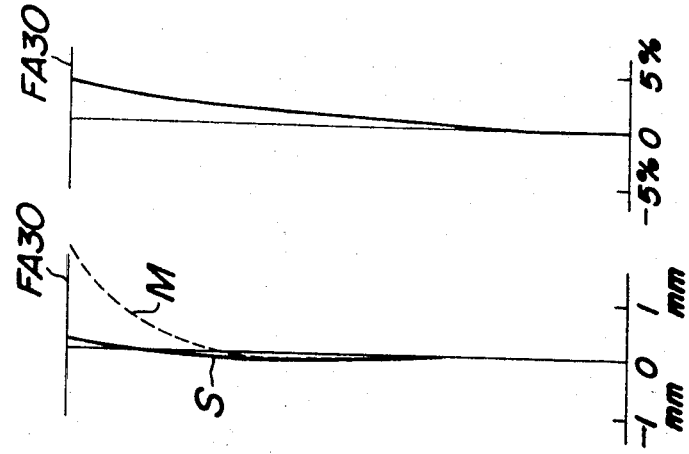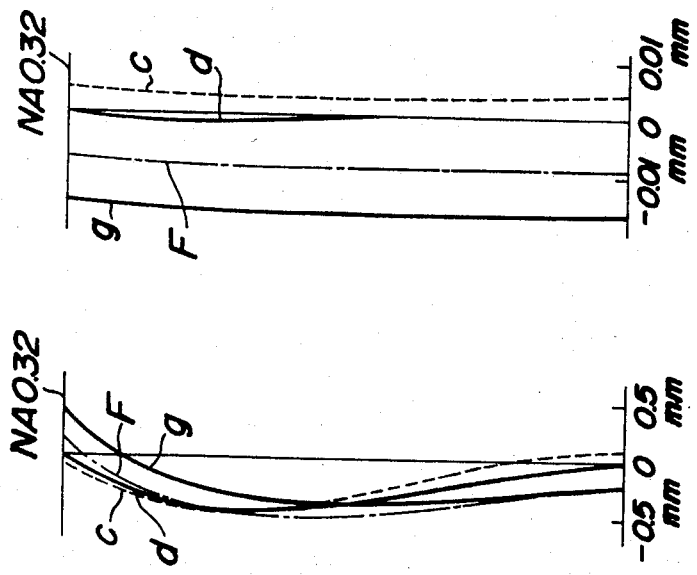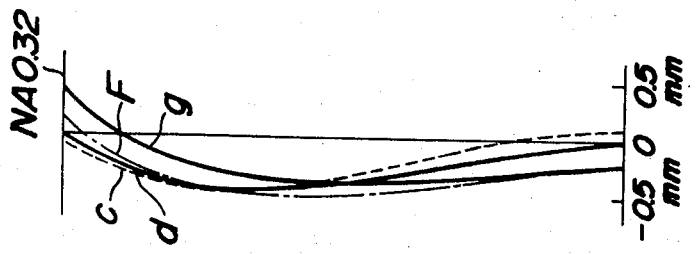

PLANAPOCHROMATIC OBJECTIVE LENS SYSTEMS FOR USE IN MICROSCOPES

This invention relates to a planapochromatic objective lens system adapted for use in microscopes and having a magnification on the order of 10X and for forming a plane image surface.

In general, theoretical attempts have been made on an apochromatic lens system comprising three thin single lenses. Such apochromatic lens system as is required to form a plane image surface becomes complex in its lens system, and as a result, the theoretical considerations for such planapochromatic lens system become considerably difficult.

As in the case of the apochromatic lens system comprising three thin single lenses, it is an important problem for the planapochromatic lens system to suitably select glass materials in order to remove the chromatic aberration from the lens system. Improper selection of the glass materials results in that the secondary spectrum cannot be removed.

The object of the invention, by adopting suitable dimensions for all of lenses and suitable combination and arrangement thereof, is to provide a planapochromatic objective lens system adapted for use in microscopes and having a magnification on the order of 10X and for forming a plane image surface, and in which substantially no secondary spectrum is present.

A feature of the invention is the provision of a planapochromatic objective lens system for use in microscopes, which is constructed as two groups and six lenses and in which a first group of lenses comprises a first negative meniscus lens that has at its object side a concave surface and a second positive lens slightly air spaced from the first meniscus lens, and a second group of lenses is separated from the first group of lenses by a long air space and comprises a compound lens including third, fourth and fifth lenses, the fourth lens sandwiched between the third and fifth lenses being made of fluorspar, and a sixth positive lens having a significantly large dispersive power, and which is defined by the following five conditions, i.e., 1. $\nu > 45$ for all lenses except the first lens,
2. $\nu_6 \geq 70$,
3. $30 > \nu_5 - \nu_3 > 10$,
4. $d_1 > |r1| + |r2|/2$, and
5. $r_5 < 0$ where $\nu$ is the dispersive powers of all of the lenses, $\nu_3$, $\nu_5$ and $\nu_6$ are the dispersive powers of the third, fifth and sixth lenses, respectively, $d_1$ is the axial thickness of the first lens, and $r_1$, $r_2$ and $r_5$ are the radii of curvatures of the front and rear surfaces of the first lens and of the front surface of the third lens, respectively, wherein specific values are chosen for the air spaces, refractive indexes and dispersive powers of the six lenses.

For a better understanding of the invention the same will be explained by reference to the accompanying drawings, in which:

FIG. 1 diagrammatically shows in cross-section a planapochromatic objective lens system constructed according to the invention; and FIGS. 2a to 2d, 3a to 3d and 4a to 4d show aberration characteristic curves of exemplary embodiments of the invention, of which FIGS. 2a through 2d are preferred.

Referring to the drawings, a planapochromatic objective lens system according to the invention is generally shown in FIG. 1, in which $L_1$ designates a first meniscus lens that has at its object side a concave surface, and $L_2$ shows a second positive lens slightly air spaced from the first meniscus lens $L_1$. The first and second lenses $L_1$ and $L_2$ constitute a first group of lenses I. A second group of lenses II comprises third, fourth, fifth and sixth lenses $L_3$, $L_4$, $L_5$ and $L_6$ and is separated from the first group of lenses I by a long air space $d_4$. The third, fourth and fifth lenses $L_3$, $L_4$ and $L_5$ constitute a compound lens with the fourth lens $L_4$ made of fluorspar sandwiched between the third and fifth lenses $L_3$ and $L_5$. The sixth lens $L_6$ is a positive lens having a significantly large dispersive power $\nu_6$.

In accordance with the invention, the dispersive powers $\nu$ of all of the lenses $L_1$ to $L_6$, the dispersive powers $\nu_3$, $\nu_5$ and $\nu_6$ of the first, fifth and sixth lenses $L_1$, $L_5$ and $L_6$, the axial thickness $d_1$ of the first lens $L_1$ and the radii of curvatures $r_1$, $r_2$ and $r_5$ of the front and rear surfaces of the first lens $L_1$ and of the front surface of the third lens $L_3$ are defined by the following five conditions, i.e., 1. $\nu > 45$ for all lenses except the first lens $L_1$,
2. $\nu_6 \geq 70$,
3. $30 > \nu_5 - \nu_3 > 10$,
4. $d_1 > |r_1| + |r_2|/2$, and
5. $r_5 < 0$.

The planapochromatic objective lens system according to the invention is based upon recognition of the fact that an objective lens system can be made free from chromatic aberration or made apochromatic if the objective lens system comprises first and second groups of lenses and the second groups of lenses includes a lens made of fluorspar that corrects the secondary spectrum, while the chromatic aberrations of the other lenses are made also small so as to correct the chromatic aberration of the lens system as a whole by making the dispersive powers of all of the lenses except the first lens $L_1$ larger than 45.

The second and third conditions that $\nu_6 \geq 70$ and $30 > \nu_5 - \nu_3 > 10$ serve to remove the secondary spectrum with the aid of the first condition that $\nu > 45$ for all of the lenses except the first lens $L_1$. If the second and third conditions are not satisfied, it is impossible to remove the secondary spectrum. Thus, the effect of removing the secondary spectrum is only obtained when all of the first, second and third conditions are satisfied.

The fourth condition that $$d_1 > |r_1| + |r_2|/2$$

makes the first negative meniscus lens $L_1$ thick and is capable of making the image surface flat. If this fourth condition is not satisfied, it becomes difficult to make the image surface flat.

The fifth condition that $r_5 < 0$ makes the radius of curvature $r_5$ negative, that is, that surface of the third lens $L_3$ of the compound lens consisting of the third, fourth and fifth lenses $L_3$, $L_4$ and $L_5$ which is near the object is made concave with respect to the object (not shown), and as a result, the spherical aberration is substantially removed while the various aberrations become balanced, thereby significantly correcting the various aberrations. If the above mentioned surface of the third lens $L_3$ is convex, that is, if $r_5 > 0$, the sufficient correction of the spherical aberration could not be obtained.

The invention will now be described with reference to the following examples.

All of planapochromatic objective lens systems illustrated in the following examples are constructed as shown in FIG. 1. Example 1 is preferred.

EXAMPLE 1

| | | $n_1=1$ | |
|---|---|---|---|
| $r_1=-3.581$ | $d_1=5.16$ | $n_2=1.7847$ | $\nu_1=25.7$ |
| $r_2=-6.611$ | $d_2=0.06$ | $n_3=1$ | |
| $r_3=27.006$ | $d_3=1.49$ | $n_4=1.4339$ | $\nu_2=95.2$ |
| $r_4=-14.188$ | $d_4=15.53$ | $n_5=1$ | |
| $r_5=-30.691$ | $d_5=1.00$ | $n_6=1.7$ | $\nu_3=48.1$ |
| $r_6=81.624$ | $d_6=2.44$ | $n_7=1.4339$ | $\nu_4=95.2$ |
| $r_7=-6.875$ | $d_7=1$ | $n_8=1.4875$ | $\nu_5=70.2$ |
| $r_8=14.214$ | $d_8=0.1$ | $n_9=1$ | |
| $r_9=35.611$ | $d_9=1.96$ | $n_{10}=1.4861$ | $\nu_6=81.8$ |
| $r_{10}=-17.348$ | | $n_{11}=1$ | |

$\beta=-10.0$.

Various aberration characteristic curves of the present embodiment are shown in FIGS. 2a to 2d. FIG. 2a shows the spherical and chromatic aberrations, FIG. 2b the OSC', FIG. 2c the astigmatisms, and FIG. 2d the distortion.

As seen from these aberration characteristic curves shown in FIGS. 2a to 2d, the lens system according to the present embodiment makes it possible to balance the various aberrations, substantially remove the secondary spectrum as shown in FIG. 2a, and form a plane image surface as shown in FIG. 2d.

Example 2

| | | $n_1=1$ | |
|---|---|---|---|
| $r_1=-2.566$ | $d_1=4.81$ | $n_2=1.4978$ | $\nu_1=67.0$ |
| $r_2=-4.943$ | $d_2=0.45$ | $n_3=1$ | |
| $r_3=21.73$ | $d_3=1.62$ | $n_4=1.7292$ | $\nu_2=54.8$ |
| $r_4=-22.81$ | $d_4=17.69$ | $n_5=1$ | |
| $r_5=-37.998$ | $d_5=1.00$ | $n_6=1.6201$ | $\nu_3=49.8$ |
| $r_6=15.818$ | $d_6=3.49$ | $n_7=1.4339$ | $\nu_4=95.2$ |
| $r_7=-7.011$ | $d_7=1.36$ | $n_8=1.4875$ | $\nu_5=70.0$ |
| $r_8=-16.09$ | $d_8=0.11$ | $n_9=1$ | |
| $r_9=27.508$ | $d_9=2.68$ | $n_{10}=1.4339$ | $\nu_6=95.2$ |
| $r_{10}=-25.728$ | | $n_{11}=1$ | |

$\beta=-10.0$.

Figure 3A:
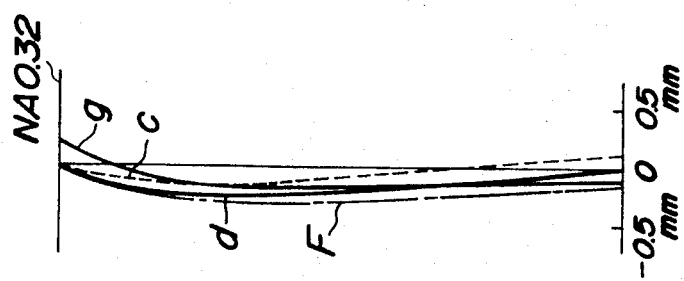

For the sake of completeness, various aberration characteristic curves of the present embodiment are shown in FIGS. 3a to 3d. FIG. 3a shows the spherical and chromatic aberrations, FIG. 3b the OSC', FIG. 3c the astigmatisms, and FIG. 3d the distortion.

As seen from these aberration characteristic curves shown in FIGS. 3a to 3d, the lens system according to the present embodiment makes it also possible to balance the various aberrations, substantially remove the secondary spectrum as shown in FIG. 3a, and form a plane image surface as shown in FIG. 3d.

Further aberration characteristic curves of the present embodiment are shown in FIGS. 4a to 4d.

FIG. 4a shows the spherical and chromatic aberrations, FIG. 4b the OSC', FIG. 4c the astigmatisms, and FIG. 4d the distortion.

As seen from these aberration characteristic curves shown in FIGS. 4a to 4d, the lens system according to the present embodiment makes it also possible to balance the various aberrations, substantially remove the secondary spectrum as shown in FIG. 4a, and form a plane image surface as shown in FIG. 2d.

EXAMPLE 3

| | | $n_1=1$ | |
|---|---|---|---|
| $r_1=-3.709$ | $d_1=5.79$ | $n_2=1.7847$ | $\nu_1=25.7$ |
| $r_2=-7.187$ | $d_2=0.06$ | $n_3=1$ | |
| $r_3=39.087$ | $d_3=1.35$ | $n_4=1.4339$ | $\nu_2=95.2$ |
| $r_4=-12.182$ | $d_4=14.75$ | $n_5=1$ | |
| $r_5=22.037$ | $d_5=1.00$ | $n_6=1.6994$ | $\nu_3=49.7$ |
| $r_6=18.13$ | $d_6=3.2$ | $n_7=1.4339$ | $\nu_4=95.2$ |
| $r_7=-6.18$ | $d_7=1.0$ | $n_8=1.4875$ | $\nu_5=70.0$ |
| $r_8=-13.26$ | $d_8=0.1$ | $n_9=1$ | |
| $r_9=41.663$ | $d_9=2.0$ | $n_{10}=1.4861$ | $\nu_6=81.5$ |
| $r_{10}=-15.57$ | | $n_{11}=1$ | |

$\beta=-10.0$.

What is claimed is:

1. A planapochromatic objective lens system for use in microscopes, which is constructed as two groups and six lenses and in which a first group of lenses comprises a first negative meniscus lens that has at its object side a concave surface, and a second positive lens slightly air spaced from said first meniscus lens, and a second group of lenses is separated from said first group of lenses by a long air space and comprises a compound lens including third, fourth and fifth lenses, the fourth lens sandwiched between the third and fifth lenses being made of fluorspar, and a sixth positive lens having a significantly large dispersive power, and which is defined by the following five conditions, i.e., 1. $\nu > 45$ for all lenses except the first lens,
2. $\nu_6 \geq 70$,
3. $30 > \nu_5 - \nu_3 > 10$,
4. $d_1 > |r_1| + |r_2|/2$, and
5. $r_5 < 0$ where $\nu$ is the dispersive powers of all of the lenses, $\nu_3$, $\nu_5$ and $\nu_6$ are the dispersive powers of the third, fifth and sixth lenses, respectively, $d_1$ is the axial thickness of the first lens, and $r_1$, $r_2$ and $r_5$ are the radii of curvatures of the front and rear surfaces of the first lens and of the front surface of the third lens, respectively, wherein the radii of curvatures $r_1$ to $r_{10}$, the air spaces or axial thicknesses $d_1$ to $d_9$, refractive indexes $n_1$ to $n_{11}$, and dispersive powers $\nu_1$ to $\nu_6$ of the six lenses as counted in succession from the object side are defined by the folowing values,

| | | | | | $n_1=1$ | |
|---|---|---|---|---|---|---|
| I | $L_1$ | $r_1=-3.581$ | $d_1=5.16$ | $n_2=1.7847$ | $\nu_1=25.7$ |
| | | $r_2=-6.611$ | $d_2=0.06$ | $n_3=1$ | |
| | $L_2$ | $r_3=27.006$ | $d_3=1.49$ | $n_4=1.4339$ | $\nu_2=95.2$ |
| | | $r_4=-14.188$ | $d_4=15.53$ | $n_5=1$ | |
| | $L_3$ | $r_5=-30.691$ | $d_5=1.00$ | $n_6=1.7$ | $\nu_3=48.1$ |
| | $L_4$ | $r_6=18.624$ | $d_6=2.44$ | $n_7=1.4339$ | $\nu_4=95.2$ |
| II | $L_5$ | $r_7=-6.875$ | $d_7=1$ | $n_8=1.4875$ | $\nu_5=70.2$ |
| | | $r_8=-14.214$ | $d_8=0.1$ | $n_9=1$ | |
| | $L_6$ | $r_9=35.611$ | $d_9=1.96$ | $n_{10}=1.4861$ | $\nu_6=81.8$ |
| | | $r_{10}=-17.348$ | | $n_{11}=1$ | |

$\beta=-10.0$.

* * * * *